US009715635B2

(12) United States Patent
Komarov et al.

(10) Patent No.: US 9,715,635 B2
(45) Date of Patent: Jul. 25, 2017

(54) APPARATUS FOR IDENTIFYING DOCUMENTS

(75) Inventors: Ilya Komarov, Berlin (DE); Olaf Dressel, Wustermark (DE); Frank Fritze, Berlin (DE); Manfred Paeschke, Basdorf (DE)

(73) Assignee: Bundesdruckerei GmbH, Berlin (DE)

( * ) Notice: Subject to any disclaimer, the term of this patent is extended or adjusted under 35 U.S.C. 154(b) by 621 days.

(21) Appl. No.: 14/241,908

(22) PCT Filed: Aug. 28, 2012

(86) PCT No.: PCT/EP2012/066675
§ 371 (c)(1),
(2), (4) Date: Apr. 9, 2014

(87) PCT Pub. No.: WO2013/030186
PCT Pub. Date: Mar. 7, 2013

(65) Prior Publication Data
US 2014/0212041 A1  Jul. 31, 2014

(30) Foreign Application Priority Data
Sep. 1, 2011 (DE) .................. 10 2011 082 028

(51) Int. Cl.
| G06K 9/18 | (2006.01) |
| --- | --- |
| G07D 7/12 | (2016.01) |
| G07D 7/20 | (2016.01) |

(52) U.S. Cl.
CPC ............. *G06K 9/18* (2013.01); *G07D 7/12* (2013.01); *G07D 7/20* (2013.01)

(58) Field of Classification Search
CPC ............. G06K 9/18; G07D 7/12; G07D 7/20
See application file for complete search history.

(56) References Cited

U.S. PATENT DOCUMENTS

| 7,420,663 B2 * | 9/2008 | Wang .................. G01J 3/02 356/326 |
| --- | --- | --- |
| 2003/0136837 A1 | 7/2003 | Amon et al. |

(Continued)

FOREIGN PATENT DOCUMENTS

| CN | 1449547 A | 10/2003 |
| --- | --- | --- |
| DE | 102 15 495 A1 | 10/2003 |

(Continued)

OTHER PUBLICATIONS

International Search Report for PCT/EP2012/066675 dated Jan. 3, 2013.

(Continued)

*Primary Examiner* — Edward Park
(74) *Attorney, Agent, or Firm* — Marshall, Gerstein & Borun LLP (57) ABSTRACT

An apparatus for document identification, having a capture device for capturing a document feature of a document, a processor that is designed to perform document identification locally using the document feature if a processing criterion for the local performance of document identification by means of the apparatus for document identification is satisfied, and a transmitter that is designed to send a data record that is dependent on the document feature via a communication network to a communication network address if the processing criterion for the local performance of document identification by means of the apparatus for document identification is not satisfied.

18 Claims, 8 Drawing Sheets

(56) References Cited

U.S. PATENT DOCUMENTS

| | | | |
|---|---|---|---|
| 2005/0100216 A1* | 5/2005 | Myers | G06K 9/228 382/181 |
| 2008/0016358 A1* | 1/2008 | Filreis | H04L 63/123 713/176 |
| 2008/0267514 A1 | 10/2008 | Alasia et al. | |
| 2009/0080800 A1* | 3/2009 | Moraleda | G06F 17/30247 382/276 |
| 2012/0296902 A1* | 11/2012 | Deolalikar | G06F 17/30716 707/737 |

FOREIGN PATENT DOCUMENTS

| | | |
|---|---|---|
| DE | 10224256 A1 | 12/2003 |
| DE | 102004056007 A1 | 5/2006 |
| DE | 102005048205 A1 | 4/2007 |
| EP | 1168253 A1 | 1/2002 |
| WO | WO-2006092626 A1 | 9/2006 |
| WO | WO-2006127840 | 11/2006 |
| WO | WO-2007006703 A1 | 1/2007 |
| WO | WO-2007105890 A1 | 9/2007 |

OTHER PUBLICATIONS

Examination Report in German Application No. 10 2011 082 028.0 dated Jul. 20, 2012.

* cited by examiner

APPARATUS FOR IDENTIFYING DOCUMENTS

BACKGROUND OF THE INVENTION

Field of the Invention

The present invention relates to the field of document identification.

Related Technology

Modern documents, for example ID documents, driver's licenses, vehicle registration certificates, banknotes or other documents, are usually provided with optically capturable document features that, as security features, allow a document to be checked for authenticity in the course of document identification. Document identification involves such document features being optically captured and evaluated.

In order to evaluate the captured document features from document identification, document identification algorithms are usually used, which compare a document feature with a reference feature, for example. If the document feature matches the reference feature, the document is identified as being authentic, for example. If the document feature differs from the reference feature, the document is classified as false. However, document identification can also be performed on the basis of more complex document identification algorithms that, by way of example, involve wavelet transformation being performed for a document feature, as described in the document WO2007/105890.

Document identification usually involves the use of complex, fixed checkers that provide the resources that are necessary for performing document identification. Such checkers are expensive to purchase and complex to develop, however. Adapting such checkers to new technologies for document identification is therefore involved.

SUMMARY OF THE INVENTION

It is therefore the object of the present invention to provide a document identification concept that allows document identification by means of a relatively simple, in particular mobile, device such as a smartphone.

The present invention is based on the insight that the above object can be achieved by a distributed document identification concept. This can involve an apparatus for document identification, for example a checker, deciding whether document identification needs to be performed in full or in part locally or by means of a remote server. The decision can be made on the basis of the available resources of the apparatus for document identification, of the remote server or of the communication network that can connect the apparatus for document identification to the remote server. By way of example, the resources comprise computation power, storage capacity, data transmission speed or bandwidth available for the data transmission via the communication network.

According to one aspect, the invention relates to an apparatus for document identification having a capture device for capturing a document feature of a document, a processor that is designed to perform document identification locally using the document feature if a processing criterion for the local performance of document identification by means of the apparatus for document identification is satisfied; and a transmitter that is designed to send a data record that is dependent on the document feature via a communication network to a communication network address if the processing criterion for the local performance of document identification by means of the apparatus for document identification is not satisfied. By way of example, the document feature may be a security feature of the document, which security feature is optically capturable, for example.

By way of example, the communication network address may be an IP address of a remote server.

The document feature itself may be present as a data record. The term "data record" therefore covers both the document feature and the data record that is dependent on the document feature as a generic term.

The document may be one of the following documents, with or without electronics: identity document, such as ID card, passport, admission control pass, authorization pass, company pass or credit card, control character or ticket, birth certificate, driver's license or motor vehicle pass, banknote, check, postage stamp, or another means of payment, for example a bank card or credit card. The document may be single-layer or multilayer or paper-based and/or plastic-based. The document may be constructed from plastic-based films that are assembled by means of adhesive bonding and/or lamination to form a card body, the films preferably having similar material characteristics.

According to one form of implementation, the apparatus may be designed to use one of the following communication technologies for communication: GSM, LTE, UMTS, CDMA, Bluetooth or WLAN or other communication technologies that are known per se.

According to one embodiment, the capture device is an optical capture device, particularly a digital camera, or the capture device comprises an optical image sensor. By way of example, the optical image sensor may be a CMOS image sensor.

According to one embodiment, the processing criterion is satisfied if the available processing resources of the apparatus are sufficient for performing document identification, in particular by means of a predetermined document identification algorithm, or if the size of the document feature is below a prescribed threshold value, or if a data transmission speed of the communication network is below a threshold value. By contrast, the processing criterion is not satisfied, if the available processing resources of the apparatus are not sufficient for performing document identification, or if the size of the document feature exceeds a prescribed threshold value, or if a connection speed via the communication network is below a threshold value.

The available processing resources can be ascertained using a resource allocation table, for example a lookup table. Said table can also be used for storing the resources that are typically necessary for document identification, for example, particularly for different document identification algorithms.

By way of example, the document identification algorithms may be pattern comparisons or relatively complex transformation-based document identification algorithms, which are known per se. For pattern recognition, a mobile device can be used to perform algorithms such as PCA (Principal Component Analysis), i.e. methods for classifying patterns by transformation, and tree search. For the pattern recognition, a server can be used to execute algorithms such as neural network (NN) or methods based thereon, which develop the capability of classifying these data by training using one or more example classes, and support vector machine (SVM).

A comparison between the available processing resources and the processing resources that are necessary for document identification can be used to establish whether the apparatus is able to execute a predetermined document identification algorithm. If the necessary processing resources exceed the available processing resources, for example, then the processor can decide to relocate document identification, for example to a remote server that can be reached at the communication network address. Otherwise, the processor can decide to perform document identification locally, i.e. on the apparatus.

However, the processing criterion may also be related to the size of the document feature, which may be present as a data record. If the size of the document feature exceeds a prescribed threshold value, which may indicate a number of pixels, for example, then the processor can decide to relocate document identification to a remote server, for example, for example because the memory resources of the apparatus that are necessary for document identification on the basis of such a document feature are not sufficient.

If the data transmission speed of the communication network is higher than a prescribed threshold value, for example, then the processor can likewise decide to relocate document identification to a remote server in order to allow faster document identification than will be possible using the apparatus, for example. If the data transmission speed of the communication network, particularly the data transmission speed between the apparatus and the remote server, the network address of which may be the communication network address, is below a prescribed threshold value, the processor can decide to perform document identification locally, i.e. using the apparatus. This allows document identification to be performed faster than will be possible by relocating said document identification to the remote server.

According to one embodiment, the processor is designed to determine the available processing resources of the apparatus and to ascertain whether the available processing resources are sufficient for document identification by means of the processor, wherein the available processing resources comprise at least one of the following resources: processing time for performing document identification or computation power of the processor or size of the available memory of the apparatus, or availability of a document identification algorithm. By way of example, the available processing resources can be determined using a resource allocation table.

According to one embodiment, the processor is designed to determine the data transmission speed of the communication network or the available transmission bandwidth. In order to determine the data transmission speed or the transmission bandwidth, the processor can ascertain a measurement for a response time of a remote device, for example server, in the communication network or a measurement for a data throughput, for example. To this end, the apparatus may also have a receiver in order to receive a response from the remote device.

According to one embodiment, the processor is designed to produce the data record that is dependent on the document feature, in particular to produce it as explained below:

According to one embodiment, the processor is designed to produce the data record that is dependent on the document feature by anonymization of the document feature, which prevents reconstruction of the document feature, particularly by segmentation or rasterization of the document feature or by extraction of descriptive elements of the document feature, or by transformation of the document feature, particularly by Fourier transformation or by wavelet transformation or by filter transformation, or by scale invariant feature transformation (SIFT) or by segmentation of a transform of the document feature, particularly a Fourier transform, a wavelet transform or a SIFT transform, or by speeded up robust feature detection (SURF) or by the production of a hologram from the document feature or by the production of a histogram on the basis of the document feature or by optical character recognition (OCR) or by the capture of microprint. The effect achieved by the anonymization is that reconstruction of the document feature is not possible. This ensures that the anonymized document feature, which may be present in the form of data, has no contentual connection to the document and therefore does not allow reconstruction of the document or of the document feature.

The transform of the document feature can be implemented particularly by means of one of the aforementioned transformations.

To produce the histogram on the basis of the document feature, it is possible to capture frequencies of occurrence of an element of the document feature, for example a letter, and to record them in the histogram, for example. According to one embodiment, the apparatus further has a receiver for receiving a result of document identification from the communication network address via the communication network in response to the sending of the data record that is dependent on the document feature. The sending of the document feature to the communication network address sends the document feature to a remote server, for example, for relocated document identification. The remote server performs document identification on the basis of the document feature or on the basis of a data record that is dependent on the document feature and forwards a result, which may be a partial result, of document identification via the communication network to the apparatus. The apparatus can then either immediately display the result of document identification or use it for further document identification. The receiver may form a transmission/reception unit with the transmitter.

According to one embodiment, the result is a partial result of document identification, and the processor is designed to use the partial result for document identification.

According to one embodiment, the transmitter is designed to send the data record that is dependent on the document feature via the communication network to a processing server that can be reached at the communication network address in order to perform document identification.

According to one embodiment, a mobile telecommunication device is particularly a smartphone.

According to one embodiment, the invention relates to a method for document identification, having: capture of a document feature of a document; local performance of document identification using the document feature if a processing criterion is satisfied, or sending of a data record that is dependent on the document feature via a communication network to a communication network address, particularly to a remote server, for document identification if the processing criterion is not satisfied.

Further features of the method for document identification are obtained directly from the functionality of the apparatus for document identification.

According to a further aspect, the invention relates to a computer program for executing at least one of the aforementioned methods, which are described below, when the computer program is executed on a computer.

BRIEF DESCRIPTION OF THE DRAWINGS

Further exemplary embodiments are explained in more detail with reference to accompanying drawings, in which.

DETAILED DESCRIPTION

Figure 1:
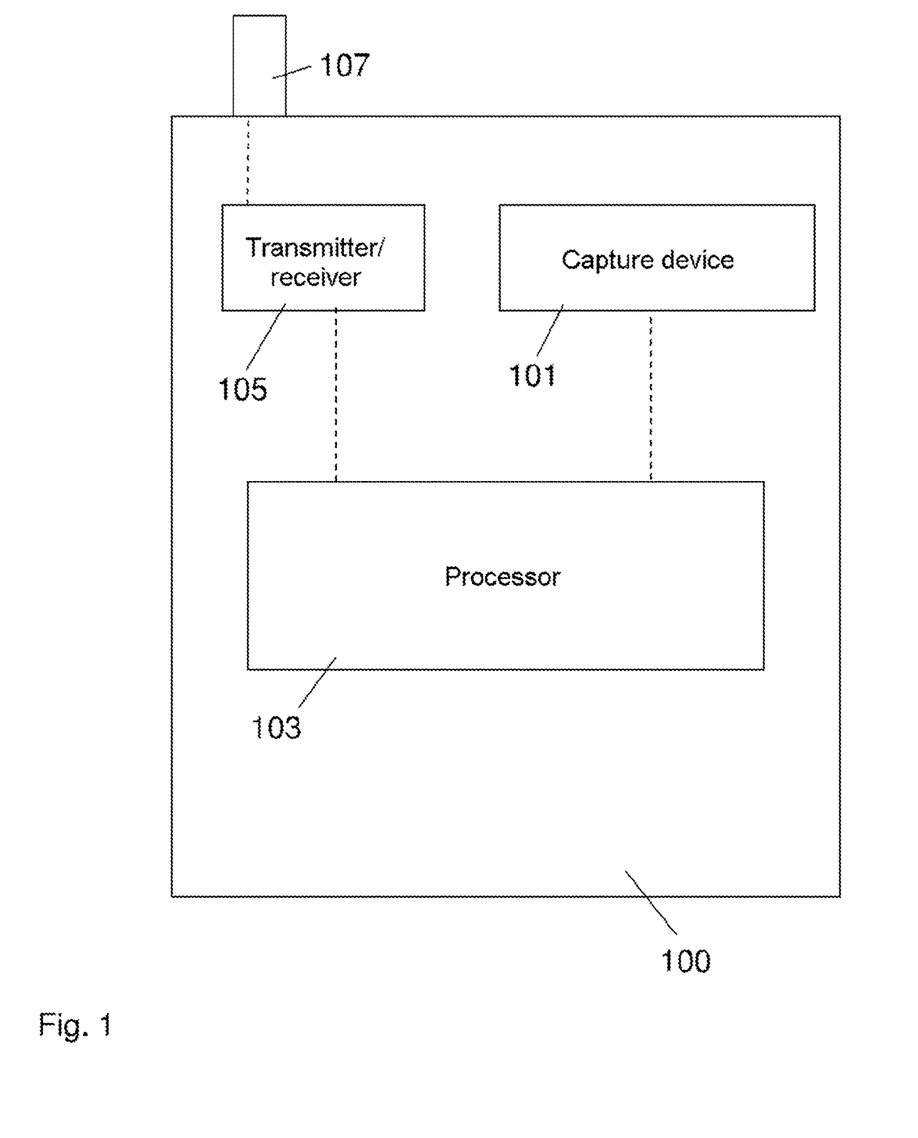
FIG. 1 shows a block diagram of an apparatus for document identification according to one embodiment.

FIG. 1 shows a block diagram of an apparatus 100 for document identification, which may be a mobile communication device, for example, particularly a smartphone. The apparatus 100 comprises a capture device 101 for capturing a document feature from a document that is not shown in FIG. 1, and a processor 103 that is designed to perform document identification locally using the captured document feature if a processing criterion for the local performance of document identification by means of the apparatus 100 is satisfied.

The apparatus 100 also comprises a transmitter 105, which can use an antenna 107, for example, to send a signal via a communication network to a communication network address. By way of example, the signal may carry a data record that is dependent on the document feature and that is sent if the processing criterion for the local performance of document identification by means of the processor 103 or by means of the apparatus is not satisfied. The apparatus may also comprise a receiver that is coupled to the antenna 107 and that is able to receive signals that are transmitted via the communication network.

The processor 103 is coupled to the capture device 101 and also to the transmitter 105. By way of example, the processor 103 can control the capture device 101 and/or the transmitter 105. The transmitter 105 can form a transmission/reception unit with a receiver.

Figure 2:
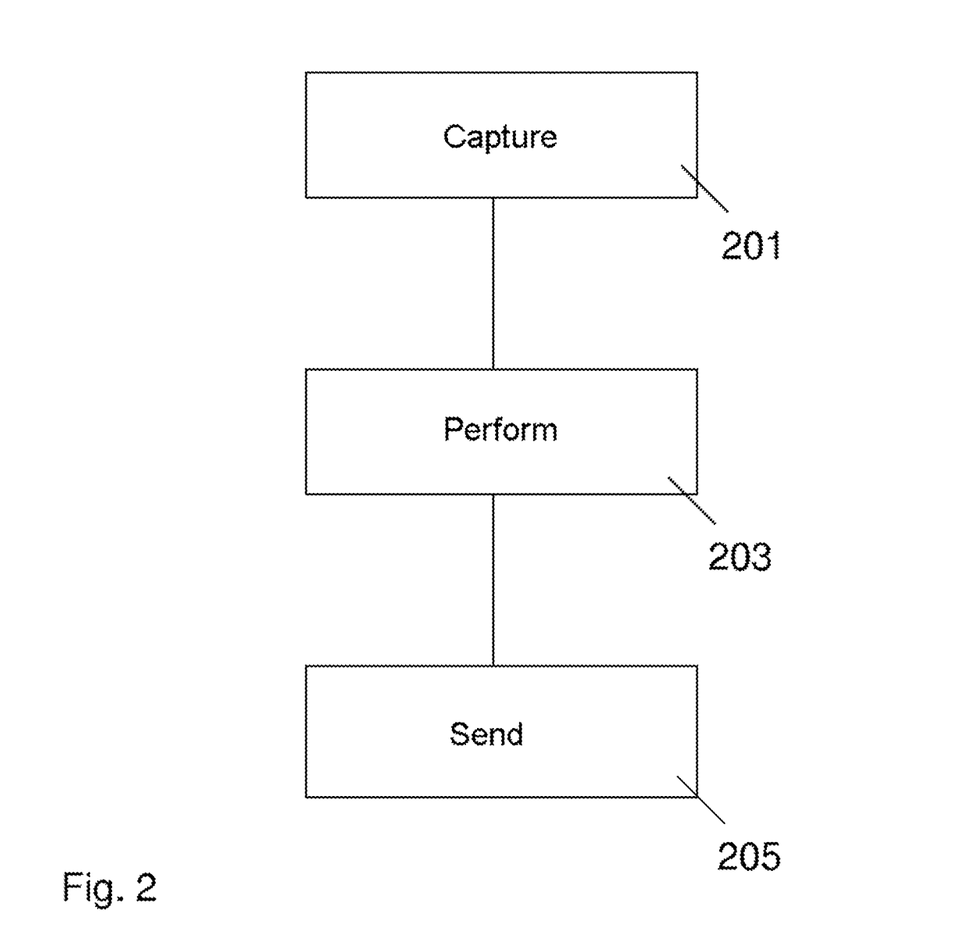
FIG. 2 shows a flowchart for a method for document identification according to one embodiment.

FIG. 2 shows a flowchart for a method for document identification having capture 201 of a document feature from a document that is not shown in FIG. 2, and local performance 203 of document identification using the document feature if a processing criterion is satisfied. The method also comprises the sending 205 of a data record that is dependent on the document feature via a communication network to a communication network address, particularly to a remote server that can be reached at this address, for the purpose of document identification if the processing criterion is not satisfied.

According to one embodiment, the data record that is dependent on the document feature may be the document feature itself. According to another embodiment, the data record may be a processed document feature, for example an anonymized document feature.

The method shown in FIG. 2 can be executed by means of the apparatus shown in FIG. 1, for example.

For the purpose of document identification, it is possible to perform comparison or analysis of the document feature, for example. The document feature may have description data from the document or from a security feature of the document that are obtained by means of image processing, for example. The possibility of relocating individual document identification steps or the entire document identification allows documents to be checked by means of a mobile communication device, which may be assisted by a remote server, for example. Hence, document identification can be performed completely by the apparatus shown in FIG. 1, for example, or completely by a remote server to which the document feature or the data record that is dependent thereon is transmitted for the purpose of document identification. Alternatively, individual document identification routines or tasks can be executed individually, collectively or in succession.

According to one embodiment, the distributed document identification can be effected such that, by way of example, a piece of application software that is executed on the apparatus 100, following a check on the present conditions, such as the available computer power of the apparatus, the image size, i.e. the size of the document feature, or the connection speed to the remote server, performs the processing steps for document identification either locally, i.e. using the apparatus 100, or centrally using a remote server. The check on the present conditions particularly involves a check to determine whether a processing criterion is satisfied. According to one embodiment, document identification can be begun simultaneously using the apparatus 100 and using the remote server, with the document identification result from that entity that delivers the document identification result first being used.

Besides the aforementioned parameters such as the available computation power of the apparatus, the image size and the connection speed to the server, the processing criterion taken into account may also be parameters such as the processing time, the aim of examination or the security requirements. In the case of the aim of examination, it is possible to decide, by way of example, whether simple document identification or complex document identification, which allows an in-depth check, needs to be performed. The security requirements stipulate whether the data to be transmitted to the remote server are encrypted, highly encrypted or not encrypted.

For weighing up the process time as a processing criterion, the handling time is obtained, by way of example, from the handling time on the apparatus 100 TG, the transfer time to the remote server TF (Transfer Forward), the processing time on the remote server TG and the transfer back time TB (Transferred Backward) to the apparatus 100. The processing of a process step on the apparatus 100 is useful if TG<TF+TS+TB, for example. The aforementioned coefficients can take into account both static and dynamic parameters. By way of example, static parameters are the computation power of the apparatus 100, for example of the processor 103 or of the hardware platform that realizes the apparatus and on which calculations are performed. The computation power is usually indicated in MIPS. Dynamic parameters are transfer times, for example, which are ascertained using a measurement of a response time for the remote server in the communication network, what is known as a PING measurement, or by a transfer method in which a data throughput is ascertained.

Figure 3:
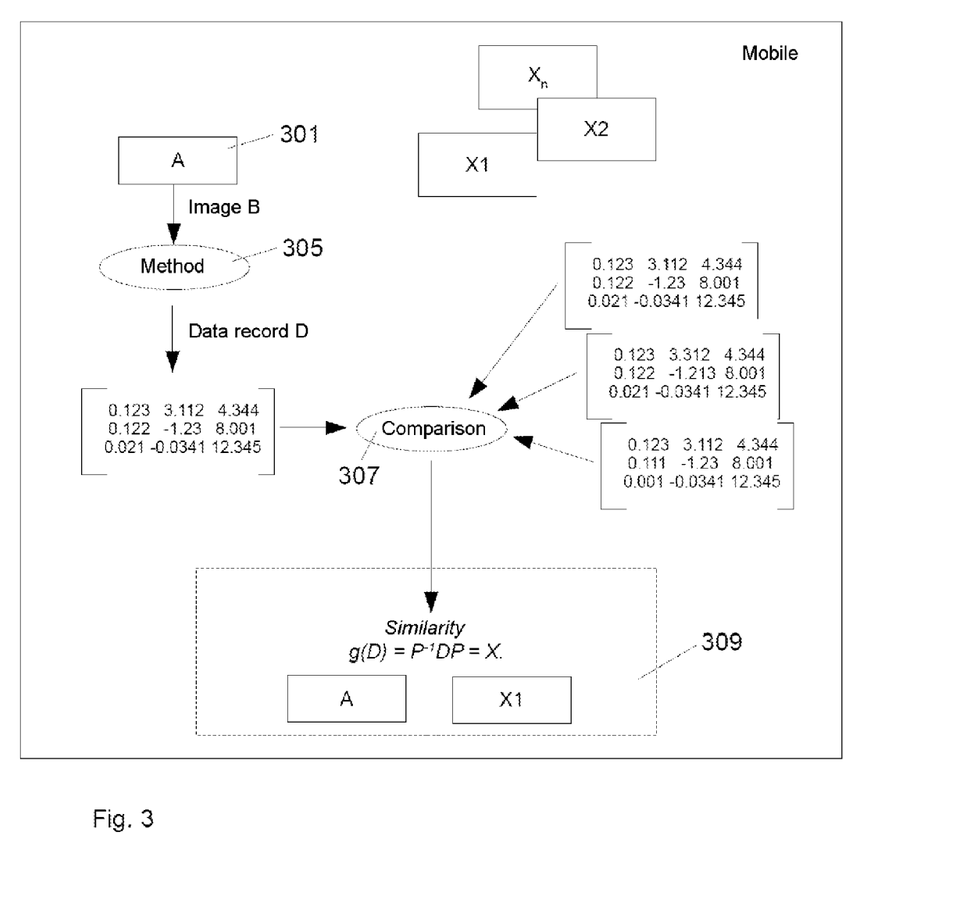
FIG. 3 shows a flowchart for a method for document identification according to one embodiment.

FIG. 3 shows a flowchart for a method for document identification in which a document X is sought for a source document 301 (A), said document being similar or identical, i.e. having the same digital description as the source document (A). To this end, the source document 301 has an image B taken of it in step 303. By way of example, the image B represents a captured document feature. According to one embodiment, the image B is edited using the method 305, which extracts descriptive features from the image B into a description data record D, for example.

These features may relate to static or randomly scattered characteristic points, for example. According to one embodiment, these features are connected to the document 301 neither directly in terms of content, for example as text, nor in terms of images, for example as patterns. This means that it is not possible to reconstruct the document from this data record. By way of example, the methods that can be used for this purpose may be SIFT, SURF or other known transformations, such as Fourier transformation or wavelet transformation.

In a subsequent step 307, the data record D, which may be a description data record, is checked against an infinite set of data records M{$X_n$}. The data records have been implemented using the same algorithm or an algorithm that is part of the method 305, for example. The check 307 can be performed using a comparison, for example, the result of which may express a direct statement regarding equality or regarding a degree of match. In a concluding step 309, information pertaining to the sample document $X_n$ that has the highest degree of match with the source document 301 is returned. The sample document may be the document $X_1$, for example.

According to one embodiment, the search for an image may be followed by a service provided on a remote server, for example. To this end, by way of example, a document image can be recorded using a mobile device, for example using the apparatus shown in FIG. 1. In a further step, the recorded image can be sent to the processed remote server. After this, the data D can be extracted and the relevant references $X_n$ can be sought and also the reference information, for example the reference image P{$X_n$}, can be returned to the mobile device for display or processing.

According to one embodiment, a search for a similarity with given references can be performed on a mobile device, for example on the apparatus shown in FIG. 1, and/or on a server. In this case, a document image that represents a document feature can be recorded using the apparatus. After this, general document characteristics, such as size or geometry, can be determined for user feedback in respect of a document position. After this, the image capture and extraction of the features, for example, can be performed using the method 305, for example. After this, the search for the match with locally existent data, for example, and provision of existent reference data or requesting further reference data can be performed by a server service. The search can be extended by forwarding the extracted data D to a server service that is executed on the remote server. Upon successful association with a reference on the server, feedback can be provided for the ascertained reference data. In the event of missing or unsafely associated reference data, these can be buffer-stored on the server, with the image being able to be requested from the mobile device. The image can be reassessed on the server and, if the result is negative again, can be supplied to further automatic or manual processing.

The aforementioned steps can be executed in parallel. In this case, the decision and the classification can be made in a distributed manner. According to one embodiment, the editing can be interrupted either by means of the apparatus 100 or by means of the remote server if a safe decision has been made.

Figure 4:
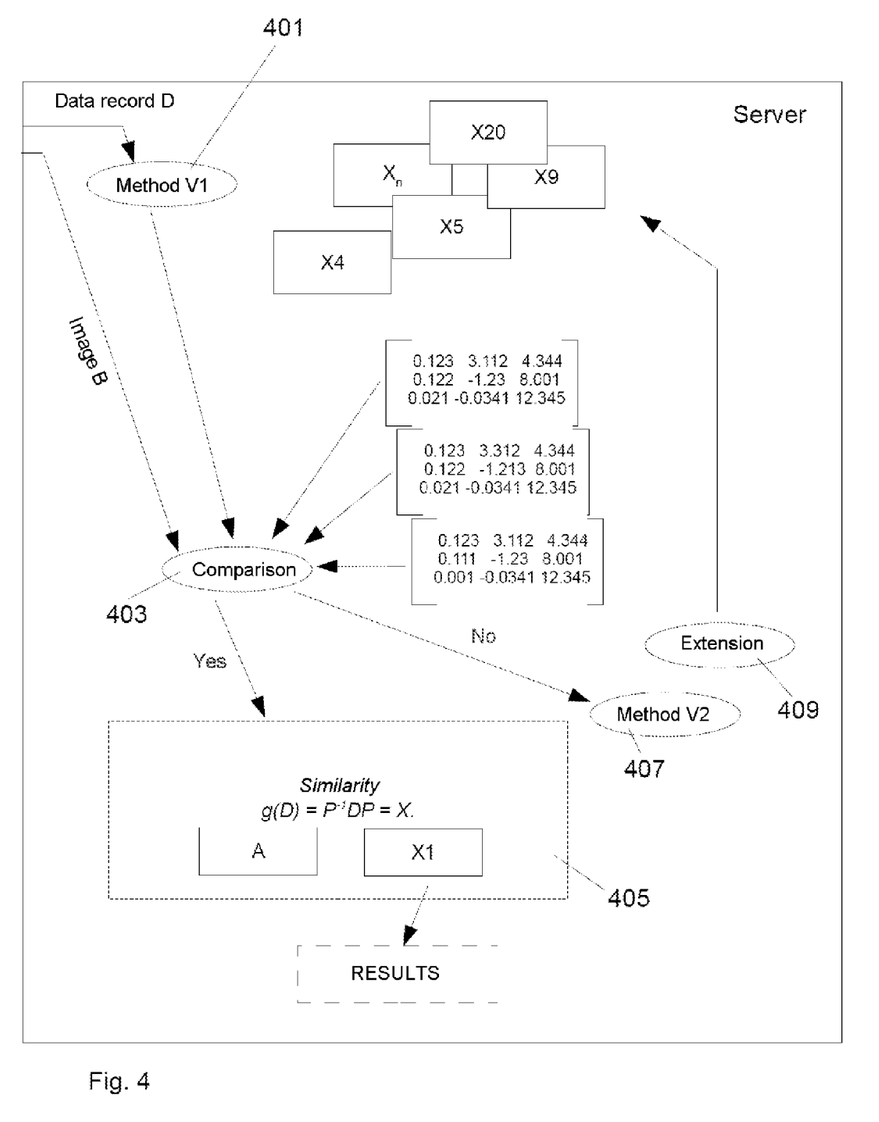
FIG. 4 shows a flowchart for a method for document identification according to one embodiment.

FIG. 4 shows a flowchart of a method for document identification that can be performed either on a mobile basis, for example using the apparatus shown in FIG. 1 or the method shown in FIG. 3, or by means of a remote server.

With reference to the exemplary embodiment shown in FIG. 3, the image B of the document 301 can be transmitted to the remote server, which executes a method 401 (V1). By way of example, the method 401 can use transformation to produce a data record D from the image B, which data record is supplied to a comparison step 403. The data record D and/or the image B and/or a partial result and/or already ascertained parameters can also be produced, transmitted to the server and supplied directly to the comparison step 403 in accordance with the method shown in FIG. 3, however. In the comparison step 403, the incoming data and reference parameters and/or document features are compared, these optionally being able to be extended by further features or changed in the extension step 409.

If the data record D matches one of the existent references $X_n$, a result—as has been described in connection with the exemplary embodiment shown in FIG. 3—can be output in step 405. The result can be transmitted back via a communication network and displayed.

If there is no match, a further method 407 (V2) can be performed, which method is more complex, for example. This may also involve the provision of the aforementioned extension 409, which resorts to the references $X_n$ again. If the comparison has a positive outcome, the result can be transmitted. Otherwise, a further, possibly alternative, analysis can be performed in method step 407.

Figure 5:
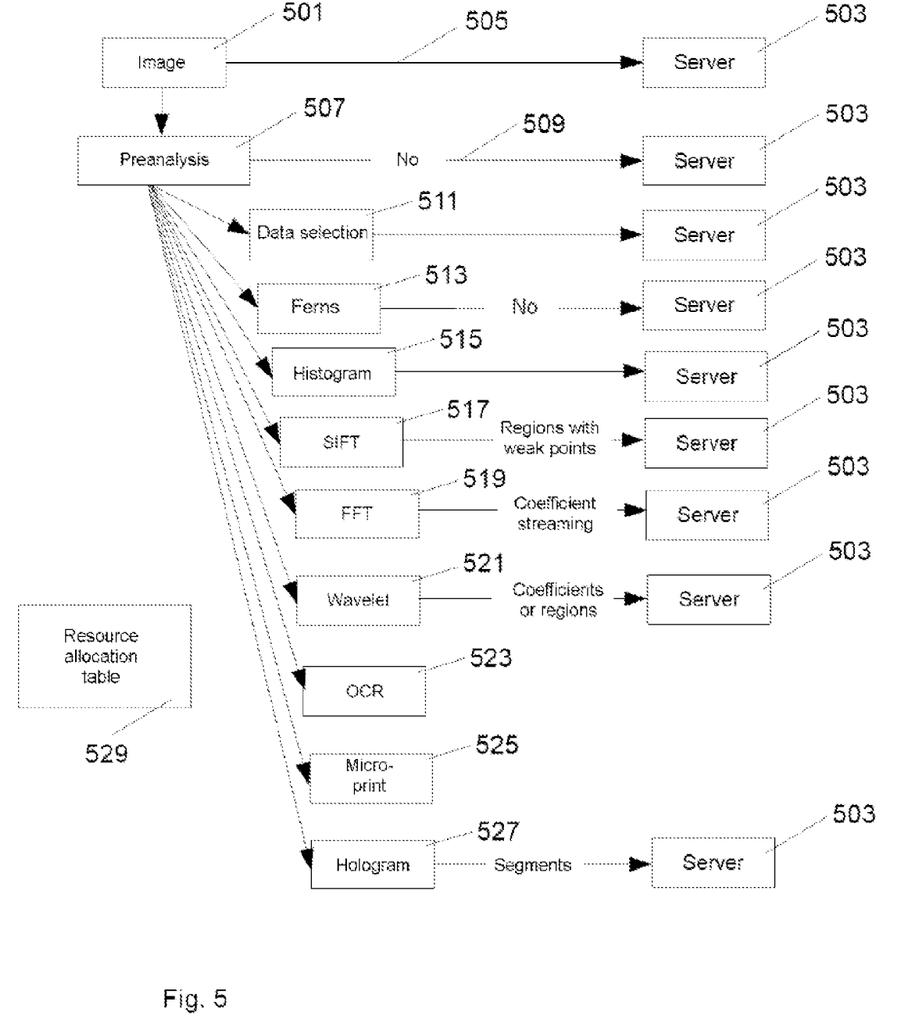
FIG. 5 shows a flowchart for a method for document identification according to one embodiment.

FIG. 5 shows a flowchart for a method for document identification in which a depiction of a document is produced in step 501 in order to capture a document feature. Step 501 also checks the resource availability, that is to say the availability of processing resources, in order to establish whether document identification needs to be executed locally, i.e. on a mobile communication device, for example, as shown in accordance with an embodiment in FIG. 1, or by means of a remote server 503. If the available resources are not sufficient for the local document identification, the document feature is transmitted to the remote server 503 for document identification in step 505. The remote server 503 performs document identification on the basis of the received document feature or, generally, a set of documents, which may also relate to a processed document feature, and transmits the result of document identification back to the sending entity. Step 505 of sending is optional, however.

According to one embodiment, however, step 501 may be followed by the performance, for example in step 507, of preanalysis of the document feature or of a document data record in order to decide which document identification algorithm, for example which image identification method, needs to be used for document identification. Following the pre-analysis, the availability of the locally available processing resources is checked. If too few processing resources are available, the document feature or a data record that can be derived from the document feature is transmitted to the remote server 503 for document identification in step 509.

Instead of step 509 of sending, a data selection can be performed in step 511 in order to produce a set of documents. The availability of the processing resources is then checked. On the basis of the availability of the processing resources, the selected data record is either used locally for document identification or transmitted to the remote server 503.

Alternatively, step 507 can be followed by step 513, in which the document feature is filtered or windowed, for example. In this case, what are known as keypoints can be arranged or captured by means of the inherently known trees-and-ferns method.

Before step 513 or after step 513, the availability of the resources is checked and the resulting data are either used locally for document identification or transmitted to the server 503 for document identification. By way of example, these data may comprise a few transformation levels.

Alternatively, step 507 can be followed by step 515, in which the document feature is taken as a basis for producing a histogram. Before or after step 515, the availability of the processing resources is checked. The histogram is either used locally for document identification or transmitted to the remote server 503 for document identification, depending on the available processing resources.

Alternatively, step 507 may be followed by step 517, in which SIFT transformation of the document feature takes place. After or before step 517, the availability of the processing resources is checked. Depending on the locally available processing resources, the transformed set is either used locally for document identification or transmitted to the server 503 for document identification. In this case, it is also possible for regions with weak points to be transmitted to the server 503.

Alternatively, step 507 may be followed by step 519, in which the Fourier transformation, for example the fast Fourier transformation (FFT), is performed. Before or after step 519, the availability of the resources is checked. Depending on the available resources, the transformed data are either used locally for document identification or transmitted to the remote server 503. In this case, it is either possible for the coefficients of the Fourier transformation to be sent by what is known as streaming, or alternatively it is possible for selected images or frequency values to be sent.

Alternatively, step 507 may be followed by step 521 of wavelet transformation. After or before step 521, the availability of the resources is checked. Depending on the available resources, the data transformed by means of the wavelet transformation are either used locally for document identification or are transmitted to the remote server 503 for document identification. In this case, coefficients or particular transformation regions can be transmitted to the server 503.

Alternatively, step 507 can be followed in each case by further steps 523 of OCR; 525 of microstep capture or 527 of hologram creation. Before or after each of these steps, the availability of the resources is checked. Depending on the available resources, the respectively obtained data are either used locally for document identification or they are sent to the remote server 503. In the case of hologram production in step 507, selected segments can be sent to the server for more precise checking, for example.

By way of example, the availability of the resources can be implemented on the basis of a resource allocation table 529, which may be stored in a memory on a local apparatus, for example the apparatus 100 shown in FIG. 1.

Figure 6:
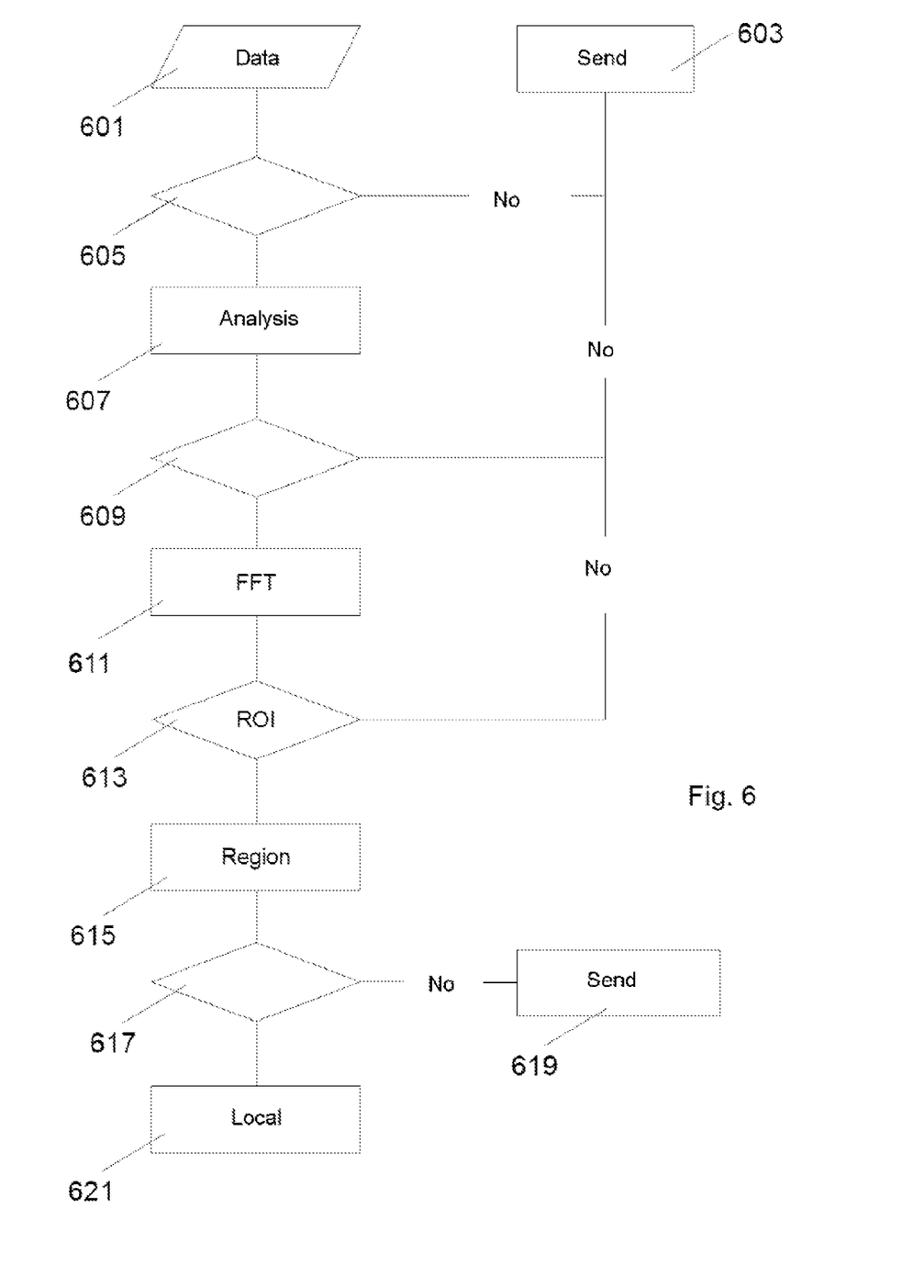
FIG. 6 shows a flowchart for a method for document identification according to one embodiment.

FIG. 6 shows a flowchart for a method for document identification with step 601 of capturing a document feature from a document or of producing a data record from the document feature and also with step 603 of sending the document feature or the data record to a remote server. After step 601, the available resources for document identification are checked in step 605. If the available resources are sufficient for local document identification, a data preanalysis is performed in step 607. Otherwise, the data are sent to the remote server in step 603.

After step 607, a check is performed in step 609 to determine whether features that allow document identification have been found. If features have been found, the method proceeds in step 611 with the fast Fourier transformation. Otherwise the method proceeds further with step 603.

After step 611, a check is performed in step 613 to determine whether the transform produced in step 611 has characteristic regions, what are known as regions of interest (ROI), with characteristic frequencies. If such frequencies are existent, the associated characteristic regions are selected in step 615. Otherwise, the method proceeds further with step 603.

After step 615, a check is performed in step 617 to determine whether document identification can be continued locally. If not, the regions are sent to the remote server in step 619, said remote server performing document identification. Otherwise, document identification is continued locally in step 621 after step 617.

Figure 7:
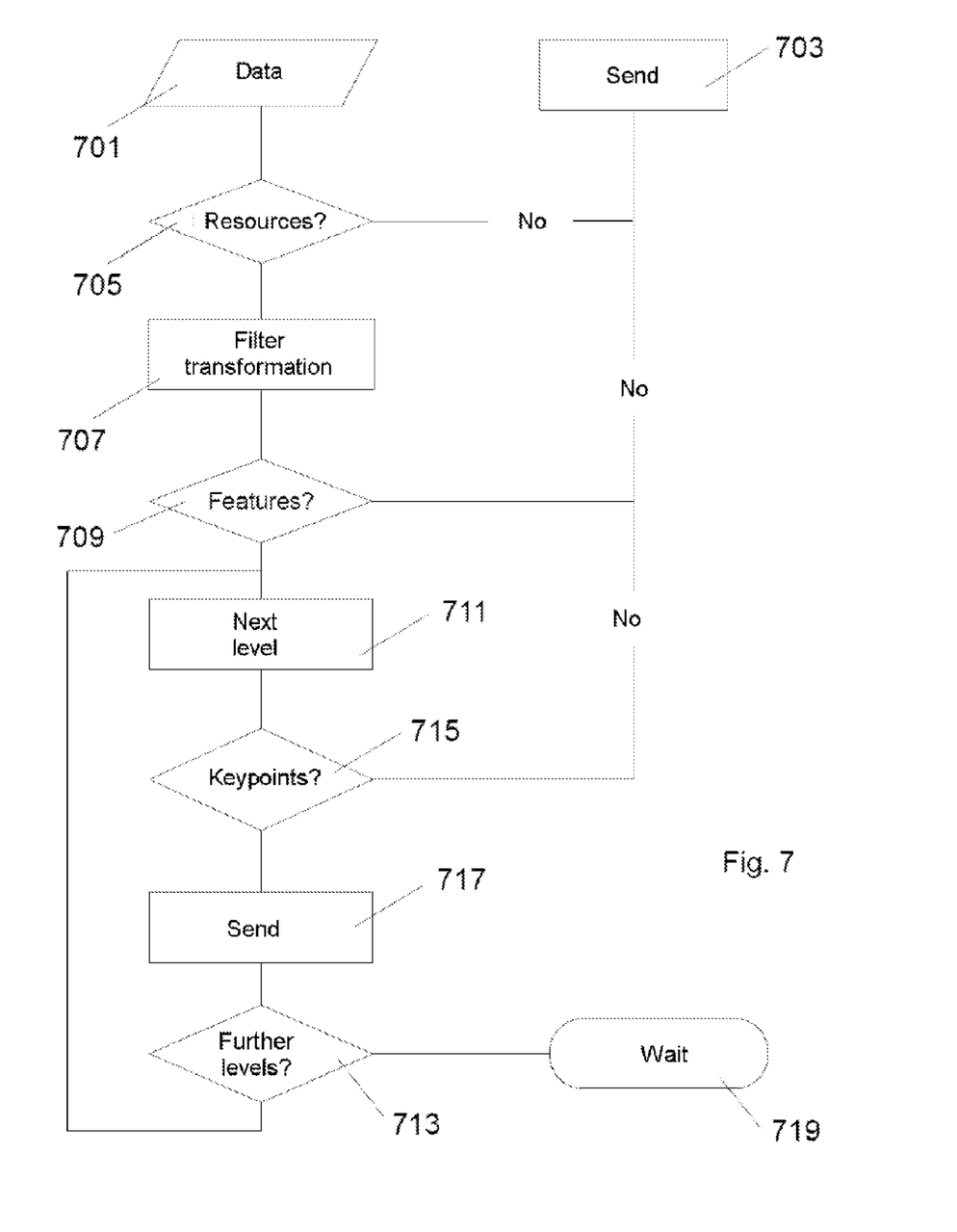
FIG. 7 shows a flowchart for a method for document identification according to one embodiment.

FIG. 7 shows a flowchart for a method for document identification with step 701 of capturing a document feature or of deriving a data record from the document feature. In both cases, data are provided. The method also comprises step 703 of sending the data to a remote server.

After step 701, the availability of the resources is checked in step 705. If there are sufficient resources available for the local document identification, filter transformation of the data is performed in step 707. Otherwise, the method proceeds with step 703.

After step 707, a check is performed in step 709 to determine whether features have been found. If features have been found, a higher document identification level, what is known as a next level, is executed in step 711. Otherwise, the method proceeds further with step 703. Alternatively, after step 709, a check can be performed in step 713 to determine whether further levels are needed.

Figure 8:
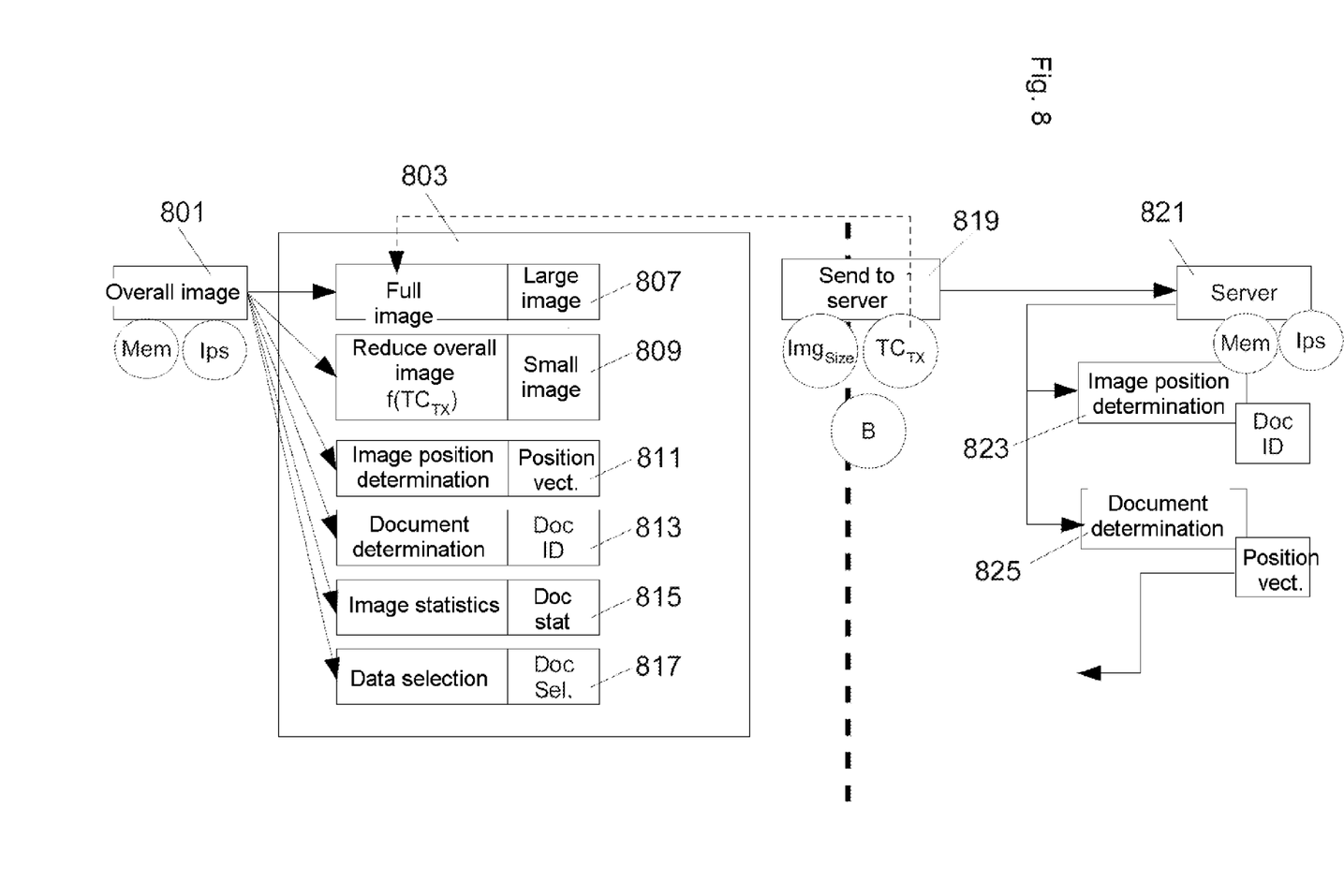
FIG. 8 shows a flowchart for a method for document identification according to one embodiment.

After step 711, a check is performed in step 715 to determine whether known keypoints are present. If known keypoints are present, keypoints from a descriptor are sent in step 717. After step 717, the method proceeds with step 713. After step 713, the method is continued with step 711, for example. Alternatively, further results can be awaited in step 719. FIG. 8 shows a flowchart for a method for document identification in which an overall image of a document is captured in step 801 by means of a mobile device, for example the apparatus from FIG. 1. Mem denotes the main memory and IPS (instructions per second) denotes the processing power of the mobile device.

The overall image can represent the document feature, for example. The overall image can be processed in step 803. To this end, the following processing steps can be performed, for example: full image capture in step 807, overall image reduction $f(TC_{TX})$ in step 809, image position determination in step 811, document determination in step 813, image statistics capture in step 815 or data selection in step 817. The reduction of the overall image produces a smaller image. The image position determination captures the image position vectorially, for example. The document determination captures the document ID (Doc ID), for example. The image statistics can be taken as a basis for recording the frequency of occurrence of particular image features or document features, for example, as a result of which document statistics (Doc Stat) are captured. The data selection involves predetermined data being selected, as a result of which document selection (Doc Sel.) is performed. The algorithms that can be executed in step 803, and which may be different, can lead to different results in steps 807 to 817. These can be sent to the server on the basis of the Mem and/or IPS and also the transmission speed (TCtx). According to one embodiment, local calculation does not take place in this case.

The available resources are taken as a basis for deciding whether document identification needs to be performed locally or whether the data obtained in step 803 need to be transmitted to a remote server.

If the available resources are not sufficient for local document identification, the data are sent to a server 821 in step 819 by means of a transmission interface, for example characterized by the size of the data to be transmitted, the speed or bandwidth. After this, it is optionally possible for steps 823 of image position determination or 825 of document determination to be performed.

In order to capture the available resources, the computation power, for example, of a mobile device, for example the apparatus shown in FIG. 1, can be determined. On this basis, a local processing time can be captured. In addition, the bandwidth of the available communication channel to the server can be determined. In this way, the transmission time to the server can be captured. Furthermore, free resources of the server can be requested therefrom. In this way, the processing time at the server can be captured.

REFERENCE SYMBOLS

100 Apparatus
101 Capture device
103 Processor
105 Transmitter/receiver
107 Antenna
201 Capture
203 Perform
205 Send
301 Source document
305 Method
307 Check/comparison
309 Result
401 Method
403 Comparison
405 Result
407 Document identification method
409 Extension
501 Image
503 Server
505 Send
507 Preanalysis
509 Send
511 Data selection
513 Windowing
515 Histogram
517 SIFT
519 FFT
521 Wavelet
523 OCR
525 Microprint
527 Hologram
601-619 Method steps
701-719 Method steps
801-825 Method steps
TB Transfer back time
TF Transfer time
TG Handling time

The invention claimed is:

1. An apparatus for document identification, having:
a capture device for capturing a document feature of a document;
a processor designed to perform document identification locally using the document feature if a processing criterion for the local performance of document identification by the apparatus for document identification is satisfied; and
a transmitter designed to send a data record that is dependent on the document feature via a communication network to a communication network address if the processing criterion for the local performance of document identification by the apparatus for document identification is not satisfied;
wherein the processing criterion is satisfied
if the available processing resources of the apparatus are sufficient for performing document identification, or
if the size of the document feature is below a prescribed threshold value, or
if a data transmission speed of the communication network is below a threshold value, and
wherein the processing criterion is not satisfied,
if the available processing resources of the apparatus are not sufficient for performing document identification, or
if the size of the document feature exceeds a prescribed threshold value, or
if a connection speed via the communication network is below a threshold value.

2. The apparatus as claimed in claim 1, wherein the capture device is an optical capture device or wherein the capture device comprises an optical image sensor.

3. The apparatus as claimed in claim 2, wherein the optical capture device is a digital camera.

4. The apparatus as claimed in claim 1, wherein the processor is designed to determine the available processing resources of the apparatus and to ascertain whether the available processing resources are sufficient for document identification by means of the processor, wherein the available processing resources comprise at least one of the following resources: processing time for performing document identification or computation power of the processor or size of the available memory of the apparatus, or availability of a document identification algorithm.

5. The apparatus as claimed in claim 1, wherein the processor is designed to determine the data transmission speed of the communication network.

6. The apparatus as claimed in claim 1, wherein the processor is designed to produce the data record that is dependent on the document feature.

7. The apparatus as claimed in claim 1, wherein the processor is designed to produce the data record that is dependent on the document feature
by anonymization of the document feature, which prevents reconstruction of the document feature, or
by transformation of the document feature, or
by segmentation of a transform of the document feature, or
by speeded up robust feature detection (SURF), or
by production of a hologram from the document feature, or
by production of a histogram on the basis of the document feature, or
by optical character recognition (OCR), or
by capture of microprint.

8. The apparatus as claimed in claim 7, wherein the processor is designed to produce the data record that is dependent on the document feature by anonymization of the document feature, which prevents reconstruction of the document feature, by segmentation or rasterization of the document feature or by extraction of descriptive elements of the document feature.

9. The apparatus as claimed in claim 7, wherein the processor is designed to produce the data record that is dependent on the document feature by transformation of the document feature by Fourier transformation or by wavelet transformation or by filter transformation, or by scale invariant feature transformation (SIFT).

10. The apparatus as claimed in claim 7, wherein the processor is designed to produce the data record that is dependent on the document feature by segmentation of a transform of the document feature, wherein the transform is a Fourier transform, a wavelet transform, or a scale invariant feature transformation (SIFT) transform.

11. The apparatus as claimed in claim 1, which further has a receiver for receiving a result of document identification from the communication network address via the communication network in response to the sending of the data record that is dependent on the document feature.

12. The apparatus as claimed in claim 1, wherein the result is a partial result of document identification, and wherein the processor is designed to use the partial result for document identification.

13. The apparatus as claimed in claim 1, wherein the transmitter is designed to send the data record that is dependent on the document feature via the communication network to a remote server that can be reached at the communication network address to perform document identification.

14. The apparatus as claimed in claim 1, which is a mobile telecommunication device.

15. The apparatus as claimed in claim 14, which is a smartphone.

16. The apparatus as claimed in claim 1, wherein the processing criterion is satisfied if the available processing resources of the apparatus are sufficient for document identification by a predetermined document identification algorithm.

17. A method for document identification, comprising:
capturing a document feature of a document;
locally performing document identification using the document feature if a processing criterion is satisfied, or
sending a data record that is dependent on the document feature via a communication network to a communication network address for document identification if the processing criterion is not satisfied;
wherein the processing criterion is satisfied
if the available processing resources of the apparatus are sufficient for performing document identification, or
if the size of the document feature is below a prescribed threshold value, or
if a data transmission speed of the communication network is below a threshold value, and
wherein the processing criterion is not satisfied,
if the available processing resources of the apparatus are not sufficient for performing document identification, or
if the size of the document feature exceeds a prescribed threshold value, or
if a connection speed via the communication network is below a threshold value.

18. The method as claimed in claim 17, comprising sending the data record that is dependent on the document feature via a communication network to a remote server for document identification if the processing criterion is not satisfied.

* * * * *